United States Patent Office 3,651,221
Patented Mar. 21, 1972

3,651,221
SUGAR SUBSTITUTE ADDITIVE PREPARATIONS OF SORBITOL AND GLUCONIC ACID
Ernst Conrad, Lyckeby, and Olof Theander, Vallingby, Sweden, assignors to Lyckeby Starkelseforadling AB, Lyckeby, Sweden
No Drawing. Filed May 14, 1970, Ser. No. 37,304
Claims priority, application Sweden, May 19, 1969, 7,039/69
Int. Cl. A61k 27/00
U.S. Cl. 424—180
14 Claims

ABSTRACT OF THE DISCLOSURE

The present invention relates to the preparation of a modified saccharide material containing a combination of sugar alcohol and gluconic acid units which is suitable as an additive in foodstuffs and drugs. The process is characterized by partially hydrolysing an aqueous starch slurry, preferably of potato starch or corn starch, to a DE value of 5–60%, preferably up to 50% by acid and/or enzymatic hydrolysis to the formation of mono, di and higher oligosaccharides as well as dextrines, partial and specific oxidation of reducing glucose units to gluconic acid units, preferably to 25–70%, the present mono and/ or disacharides being removed by fermentation to alcohol before or after the oxidtaion, partly or completely hydrogenating the remaining glucone units to sorbitol units and, if required, adjusting the pH to a suitable value, if desired after having partly or completely removed the cations and after neutralization of the acids with a base of a suitable metal and, finally, concentration or complete evaporation of the product.

---

The present invention relates to a process for preparing a modified saccharide material containing a combination of sugar alcohol and gluconic acid units by partial hydrolysis of starch, partial specific oxidation of the reducing glucose units present in the hydrolysate to gluconic acid units and a partial or complete hydrogenation of the remaining reducing glucose units to soribtol units.

The process according to the invention thus comprises two or several treatment steps, the first being a partial hydrolysis of an aqueous starch slurry, preferably of potato starch or corn starch, to a dextrose equivalent value (DE value) of 5–60%, preferably up to 50%, by acid and/or enzymatic hydrolysis in a manner known per se to the formation of mono, di and higher oligosaccharides as well as higher saccharides (so-called dextrines). The second step, viz the specific oxidation, comprises oxidation of the reducing glucose units (partially) present in the hydrolysate to gluconic acid units, the mono and disaccharides present being removed by fermentation to alcohol, if so desired, before or after the specific oxidation. After the partial specific oxidation the product is submitted to a hydrogenation treatment, in which the remaining reducing glucose units completely or partly are transformed to sorbitol units. According to the invention one may, if desired, perform the partial hydrogenation before the partial specific oxidation.

It is previously known to prepare a modified starch of an acid type, so-called oxystarch, with the aid of non-specific oxidation methods and without a previous hydrolysis. Starch so modified is used for instance within the paper industry and the textile industry as a sizing agent or within the foodstuff industry as a thickening agent. The oxidation methods used comprise the use of chlorine, hypochlorite or peroxydes. However, in such a non-specific oxidation not only aldehyde groups present in the end position in the reducing suger units are oxidized but also in an unknown and varying extent also other oxidatable groups within the molecule to the formation of different types of reducing or acid units so that the product will contain carboxy groups as well as keto and aldehyde groups. Non-specifically oxidized starch thus contains carboxy groups as well as carbonyl groups at different carbon atoms in the original glucose units as well as fragmentation units formed by the splitting of carbon/carbon bondings.

The previously prepared non-specifically oxidized products mainly contain high polymer components of the same magnitude as starch and contain only a lesser amount of more low molecular polysaccharides obtained by oxidative depolymerization.

It is further known to prepare gluconic acid from glucose (dextrose) with the use of certain oxidating agents such as catalytical or microbiological agents. In such cases it has been desirable to use as a starting material a glucose which to the greatest possible extent is free from oligosaccharides and dextrines since the said substances only difficultly can be removed for obtaining a pure gluconic acid after the oxidation. Such gluconic acid is used industrially above all in combination with other substances in detergents as a sequestrating agent, as a derusting agent and within the foodstuff industry and the drug industry. Certain of the products according to the invention can be used in a similar manner and have, as compared to gluconic acid, the advantages of a lower price and more suitable properties for many different purposes, especially due to the combination with the present sorbitol groups and due to the higher mean molecular weight of the product according to the invention. Products according to the invention are especially suitable as additives in foodstuff products (especially foodstuffs of a "tooth-kind" nature) and pharmaceutical products.

The invention thus relates to a process for preparing a modified saccharide material containing a combination of sugar alcohol and gluconic acid units which is especially suitable as an additive in foodstuffs or drugs; the process is characterized by (a) Partially hydrolysing an aqueous starch slurry, preferably of potato starch or corn stach, to a DE value of 5–70° by acid and/or enzymatic hydrolysis in a manner known per se to the formation of mono, di and higher oligosaccharides as well as higher saccharides (so-called dextrines), (b) Partial and specific oxidation of reducing glucose units to gluconic acid units, preferably to 25–70%, the present mono and/or disaccharides (dextrose, maltose) optionally being removed by fermentation to alcohol before or after the oxidation.

(c) Completely or partly hydrogenation of remaining glucose units to sorbitol units, and (d) If required, adjusting the pH value to a suitable value after having completely or partly removed the cations with the aid of an ion exchange resin and, if desired, after neutralization of the acids with a base of a suitable metal (for instance calcium, iron or magnesium) for certain therapeutical or nutrition-physiological purposes. A suitable metal ion may also have been introduced already during the oxidation (for instance calcium), before or after an optional concentration, whereupon the product optionally is completely evaporated; steps (b) and (c) may, if desired, be performed in the reversed order.

As a starting material in the process according to the invention one may use starch of different types, preferably potato starch or corn starch.

Step (a)—Partial hydrolysis

The partial hydrolysis according to the invention is performed to a DE value within the range 5–60%, preferably up to 50%, to the formation of monosaccharides, disaccharides and higher oligosaccharides containing up to 10 sugar units as well as higher saccharides. Acid hydrolysis is performed by dispersion the starch in water, suitably at a dry solids content of 30–50% and at a pH of about 2–3. The hydrolysis is preferably made at an elevated temperature, if desired under pressure, for instance at a pressure of about 3 atmospheres corresponding a temperature of 130° C. and for a period of time of up to 1–2 hours depending on the desired DE value and the treatment conditions. Enzymatic hydrolysis is also suitably performed with the use of a 30–50% starch dispersion in water and with a starch hydrolysing enzyme such as for instance bacterial-α-amylase (for instance ex Novo A/S, Copenhagen, Denmark). Enzymatic hydrolysis is suitably performed at the pH which is optimal for the enzyme actually used. With the use of the above-mentioned enzyme, α-amylase, a pH of about 7 is used. The temperature at the enzymatic hydrolyses is also suitably the optimal one for the enzyme actually used. For the above-mentioned enzyme α-amylase the pH of the starch dispersion is suitably adjusted to 7.5, where upon the dispersion is heated for instance for 10–30 minutes at a temperature of up to 90° C. The enzyme is then inactivated by heating the reaction mixture for some minutes, for instance 5 minutes, to a temperature at which the enzyme is destroyed, for instance 110° C.

The hydrolysis is thus performed with a view to the intended use of the end product to the formation of monosaccharides and oligo and higher saccharides containing 2 up to some tenths or in certain cases some hundreds of monosaccharide units.

(A) For obtaining products which after the specific oxidation may be used as a sugar substitute in foodstuffs or drugs as a substitute for conventional sugars such as saccarose, glucose, fructose, maltose, it is suitable to perform the hydrolyis to the formation of monosaccharides plus mainly oligosaccharides, viz a product with a relatively high DE value (up to 50 or 60%) and a low mean molecular weight. Examples of such uses are for drugs in which the acid groups are used for binding suitable metal ions such as ions of calcium, iron or magnesium, or medicinally active organic bases. For food stuffs the products may be used as a substitute for a saccharose, for instance in jam, marmelade, drinks and similar products or for the preparation of sweets of a "tooth-kind" type. In this case a DE value is chosen within the range which gives the desired properties in the product. Thus, when it is desired to obtain a non-hygroscopic product a DE value of about 20% is chosen for dry sweets, whereas a considerably higher DE value is chosen for instance jam and similar products, viz about 40–50%.

(B) When the hydrolysis is performed to a value within the lower part of the stated range, viz to the formation of a hydrolysate containing a major amount of oligosaccharides and higher saccharides of a higher mean molecular weight and a low DE value (about 5–20%) a product is obtained after the specific oxidation and the hydrogenation which gives viscous aqueous solutions or dispersions. Such products are suitable as thickening agents or viscosity improving agents and products may be obtained having properties and uses similar to gum arabic and pectine. A common property which products sub (A) and (B) gives certain foodstuffs is a high carbohydrate concentration which prevents microbiological attack and a desired consistence without a too high degree of sweetness.

Step (b)—The specific oxidation

The oxidation step according to the invention comprises specific oxidation of the hydrolysate from step (a) so as to oxidate essentially only the reducing glucose units present therein, viz units containing aldehyde groups, to the formation of gluconic acid units. In view of the intended use of the product one may according to the invention oxidize a greater or lesser part of the reducing glucose units to gluconic acid units. As mentioned above it is then an optional measure to remove the present mono and/or disaccharides (dextrose, maltose) by fermentation to alcohol before or after the specific oxidation.

The specific oxidation according to the invention can be performed in several ways, viz by (1) catalytical oxidation
(2) enzymatic oxidation
(3) microbiological oxidation (1) In the catalytic oxidation air or oxygen is used as the oxidating agent and a noble metal catalyst is present. Different types of platinum, palladium or ruthenium catalysts with or without a carrier may be used, for instance 5–20% platinum on carbon. A suitable range for the temperature is 20–60° C., preferably within the lower part of the range so as to avoid side reactions. The oxidation is preferably performed at a pH within the range 4.5–9. The desired pH value is maintained during the oxidation, suitably by the addition of an alkali metal carbonate, bicarbonate or hydroxide or calcium carbonate or calcium hydroxide. Air or oxygen is bubbled in a finely divided state through the solution or dispersion which under the treatment is preferably stirred vigorously so as to keep the catalyst in a dispersed state. The best results have been obtained with platinum catalysts in which case the treatment time has been about 4–24 hours. It is also possible to perform the oxidation so that the aqueous solution of polysaccharide or its hydrolysate streams down through a column filled with bodies through which air or oxygen is fed in counter-current, the catalyst being located on the said bodies. It is a characteristic of this method that molecules of all sizes from dextrose up to higher saccharides will be oxidized.

After the finished treatment the catalyst substance is removed by filtration or centrifugation, whereupon the product is concentrated or completely evaporated.

(2) It is known to selectively catalyse the oxidation of monomer glucose to gluconic acid with the use of a suitable glucoseoxidase/katalase system such as the commercially available enzyme "DeeO" (ex Miles Chemical Company, USA). In this case also maltose and other lower oligosaccharides are oxidized in a lesser extent. With the use of the starting material obtained with the above-described hydrolysis for the oxidation according to the invention it is thus possible to prepare a product which essentially consists of gluconic acid, a minor amount of maltobionic acid and non-oxidized starting material in the form of oligosaccharides and dextrine. The treatment may for instance be performed at a temperature of 20–80° C., preferably 30–50° C. and most preferably at about 35° C., and with addition of air bubbles and/or peroxides (preferably hydrogen peroxide) and at a pH within the range 4–7. The enzyme preparation may be added either in the solid form or in the form of a solution.

(3) The preferred way to perform the specific oxidation is, however, microbiologically, for instance with the use of fungus (such as Aspergillus niger) or acetic acid bacteria (such as Acetobacter suboxydans) for a period of time which depending on the conditions used may be from a couple of hours up to a couple or some days. The pH range suitably used is about 3–7, preferably 4–5. The optimal temperature for the said methods is about 30° C. In industrial oxidation monomer glucose is mainly oxidized but strains are also available which oxidize maltose with a high yield.

The carbohydrate concentration during the oxidation may for all methods be between 5 and 50%, preferably 15–30%. From the product obtained by the oxidation one may optionally after all of the oxidation methods precipitate lower acids formed in the form of insoluble salts, for instance in the form of calcium salts, and one may, if desired, obtain a certain fractionation of the product by the addition of calcium ions, based on the different solubility of the different as calcium salts of the acid products.

Step (c)—The hydrogenation step

After the partial oxidation of the starch hydrolysate there is a greater or lesser number of reducing glucose units in the product, and, as mentioned above, these are hydrogenated to sorbitol units. The hydrogenation is performed conventionally, for instance with use of Raney-nickel, platinum or ruthenium. After the hydrogenation end products are obtained in which a greater or lesser number of the remaining reducing glucose groups are hydrogenated to sorbitol groups to the formation of more or less sweetly tasting products which may be used as a sugar substitute.

The hydrogenation treatment is suitable performed under a super atmospheric pressure, for instance at 40–60 atmospheres, and at an increased temperature, for instance 130–150° C.

As mentioned above one may, if desired, at first perform the partial hydrogenation of the starch hydrolysate from step (a) and then perform the specific oxidation according to (b) above. However, it is preferred to perform the hydrogenation after the specific oxidation.

During the hydrogenation the remaining reducing glucose units are transformed to sorbitol units which give the product a certain sweet taste. With increasing hydrolysis degree a correspondingly increased number of reducing units is obtained which then may be partially oxidized to gluconic acid units or hydrogenated to sorbitol units. In general it may be stated that with an increasing number of sorbitol units in the end product a corresponding degree of increased sweetness will be obtained, whereas an increased number of gluconic acid units will decrease the sweetness and add to the acidity and such products may be used for partly replacing acids commonly used in for instance sweets and fruit products.

When mono and disaccharides are fermented to alcohol one obtains, after the specific oxidation, a product which is free from gluconic acid and maltobionic acid and such a product will be suitable for many purposes. This process means that the number of groups which are oxidized to gluconic acid units is considerably reduced.

In certain cases in which one desires a completely cation-free acid product one may remove the cations by ion exchange which gives the possibility to transform the gluconic acid end groups to the lactone form which gives the product specific properties.

Products according to the invention which are especially suitable for use in foodstuffs (above all sweets) which are "tooth-kind" since they do not contain normally fermentable components, may be prepared by enzymatic or microbiological specific oxidation of a starch hydrolysate, precipitation and separation of calcium gluconate in which case the oxidation is performed in the presence of calcium or with the addition of calcium ions, for instance in the form of calcium chloride, after the oxidation and filtration and subsequent hydrogenation. In this manner a product is obtained which does not contain sorbitol but consists of hydrogenated oligo and polysaccharides and a lesser amount of buffering calcium gluconate and calcium salts of a lesser amount of higher aldonic acids which give a physiologically valuable calcium addition.

As mentioned above it is desirable for many purposes that the end product does not contain any fermentable mono or disaccharides. This is for instance true as regards the preparation of the products for foodstuff purposes, such as sweets and similar. In such cases one may by fermentation remove the said saccharides, either before or after the specific oxidation. Monosaccharides such as glucose may selectively be fermented with the use of baker's yeast, whereas fermentation with brewer's yeast will remove monosaccharides as well as disaccharides. In such a way products are obtained which are suitable from a caries-preventing point of view and for diabetics. The alcohol formed during the fermentation may be removed and obtained by distillation, either immediately after the fermentation or else after the specific oxidation.

Step (d)—The optional after-treatment

After the hydrogenation treatment above the pH of the reaction solution may be adjusted at a desired value, for instance 7, if desired decoloured for instance with the use of active carbon, concentrated and, if desired, completely evaporated. For many purposes it will be suitable to obtain the end product by spray drying.

One may also bring the carboxy groups to form salts for instance with calcium, potassium, iron, magnesium, in which case the products will have a therapeutical importance within the medicine for administrating the said metals or other trace metals to the live organism. The magnesium salts have inter alia been shown to be valuable as components in tooth pastes and for the treatment of dysmenorrhea and they have also a laxative action. The potassium salts are valuable for the treatment of hypopotassemia and in larger doses they have a laxative action.

The salts with therapeutical active organic bases such as alkaloids are better tolerated than the corresponding amount of the pure alkaloid. In general, products according to the invention containing carboxy groups may be used for the preparation of drug products which are better tolerated by the live organism than the corresponding amount of the pure active substance.

The products according to the invention contain reactive groups (carboxy groups, hydroxy groups) which may be used for further modification of the properties of the products.

The invention is further illustrated with the following examples.

EXAMPLE 1

A suspension of potato starch with a dry solids content of 45% (2000 kgs. potato meal containing 1800 kgs. dry starch and 2000 liter water) were mixed with 15 liters of 37% technical hydrochloric acid and the pH of the solution obtained was 1.8. The hydrolysis was performed for 35 minutes at a temperature of 140° C. and at a vapour pressure of 3.5 atmospheres. The product obtained had a DE value of 39%.

The reaction mixture was neutralized with 50 liters of 15% sodium carbonate solution and its pH was 6.0.

EXAMPLE 2

The starch dispersion described in Example 1 was mixed with 5 kgs. enzyme ("Biolase C 48," ex Farbwerke Hoechst AG). The pH-value was adjusted to 6.5 at the addition of the enzyme and was kept at the said value during the enzymatic hydrolysis. The suspension was heated for 20 minutes at 85° C. and a DE value of 30% was obtained. The enzyme was then deactivated by heating of the mixture to 100° C. for 15 minutes. Purification of the solution obtained was made as described in Example 1.

EXAMPLE 3

In a vessel provided with a device for achieving a finely divided stream of air 5 liters of starch hydrolysate solution (25% dry solids content and with a DE value of 39%, calculated on dry solids) were introduced. Somewhat more than 15% och saccharides consisted of dextrose. The solution was kept at 32° C., air was blown in a finely divided form through the liquid at a rate of 2000 liters per hour. At the start of the experiment 10 mls. of the above-mentioned commercially accessible enzyme preparation "DeeO" were added. The oxidation was performed for 6 hours and the pH value was kept about 5.5 by the addition of calcium carbonate (totally 70 grams). Further, 3 mls. enzyme solution were added per hour. When the oxidation was finished the pH value was adjusted to 6.5 and the solution was heated to 80° C. for destroying the enzyme, filtrated and concentrated.

After removal of the major part of the gluconic acid in the form of crystalline calcium gluconate (after concentration of the oxidation product) a lightly yellow liquid was obtained with a dry solids content of 40% and a DE value of 22%. The pH value was adjusted to 6.0.

Half a liter of this product was hydrogenated in a laboratory autoclave after addition of 1% Raney-nickel (calculated on the dry solids). Hydrogen was introduced at a pressure of 4 atmospheres and the temperature was adjusted to 150° C. The hydrogenation was performed for 2 hours. The catalyst was then removed by centifugation, whereupon the solution was treated with a cation exchange resin and an anion exchange resin. The lightly yellow product had a DE value of 0.6% and a paper chromatografic investigation showed only traces of the reducing sugars and sorbitol, a not insignificant amount of gluconic acid, lesser amounts of high molecular aldonic acids and mainly maltitol, maltotriitol and higher saccharide suger alcohols.

EXAMPLE 4

In a reaction vessel provided with a thermostate and a stirrer and a device for blowing finely divided air through the liquid *Aspergillus niger* mycelium was added (cultivated on a dextose solution at pH 3 containing nutritional salts) and a minor amount of yeast nutrition in 2 liter of starch hydrolysate solution (16% dry solids content and a DE value of 40%; the dextrose was about 18% of the carbohydrate amount). The mixture was kept at 30° C. for 2 days and was agitated at 325 r.p.m. and was aired at the rate of 80 liters of air per hour. The pH value was kept at about 7 by the addition of 5% sodium hydroxy solution. After finished treatment the mycelium was filtrated and washed with distilled water. The DE value in the almost colourless liquid was now 22.3%.

The conditions during the hydrogenation were the same as in Example 1 above, but in this case the acids in the oxidation product obtained were salt-bound with sodium instead of calcium and no precipitation of gluconate had been made before the hydrogenation. The DE value after the hydrogenation was 1.0%. A considerable amount of gluconic acid was present in the reaction product which further was similar to the one obtained in Example 1.

EXAMPLE 5

In a vessel provided with a stirrer and a device for blowing finely divided oxygen through the liquid 2 liters of starch hydrolysate solution were introduced (25% dry solids content and a DE value of 30%, calculated on dry solids). The mixture was kept at 25° C., the agitation was made at 325 r.p.m. and oxygen was blown through the solution at a rate of 400 liters per hour. The solution was admixed with 5 grams of platinum catalyst (5% on carbon) and the oxygen treatment was continued for 8 hours and the pH value was kept at about 7 all the time by the addition of 10% sodium hydroxy solution. After centrifugation of the catalyst a weakly yellow solution was obtained having the DE value 3.6%, calculated on the dry solids.

The product so obtained was hydrogenated at 40 atmospheres, 130° C. and for one hour with the use of 1% Raney-nickel (calculated on the dry solids) as a catalyst. The DE value decreased from 3.6% to 0.8%.

We claim:
1. Process for preparing modified saccharide sugar substitute additive material suitable for caries prevention or for diabetics containing sorbitol units in effective amounts for obtaining increased sweetness, and gluconic acid units in effective amounts of adding acidity and decreasing said sweetness, which comprises:
(a) partially hydrolyzing an aqueous starch slurry by acid or enzymatic hydrolysis, to a dextrose equivalent value of 5–60%, to form a mixture of saccharides, fermenting mono- and disaccharides present in the mixture to alcohol and removing same before or after step (b);
(b) catalytically, enzymatically or microbiologically oxidizing glucose units remaining in the mixture from (a) to gluconic acid groups; and
(c) completely or partly hydrogenating glucose units present in the mixture from (a) to sorbitol units before or after step (b).

2. Process of claim 1 wherein partial hydrolysis is carried out to a relatively high dextrose equivalent value or 20–60%.

3. Process of claim 1 wherein partial hydrolysis is carried out to a relatively low dextrose equivalent value of 5–20%.

4. Process of claim 1 wherein the oxidation is carried out enzymatically with glucoseoxidase/catalase enzymes 5. Process of claim 1 wherein the oxidation is carried *Aspergillus niger* fungi or *Acetobacter suboxydans* bacteria.

6. Process of claim 1 wherein 25 to 70% of the glucose units are oxidized in step (b).

7. Process of claim 1 wherein cations in the mixture from (c) are removed by ion exchange.

8. Process of claim 1 wherein the mixture from (c) is concentrated.

9. Process of claim 1 wherein product is obtained from (c) by complete evaporation.

10. A caries prevention or diabetic sugar substitute additive product produced by the process of claim 1.

11. A non-hydroscopic caries prevention or diabetic sugar substitute additive with a relatively high DE value produced by the process of claim 2.

12. A caries prevention or diabetic sugar substitute additive product with a relatively low DE value produced by the process of claim 3.

13. A dry caries prevention or diabetic food-stuff or pharmaceutical product containing as a substitute for saccharose the non-hydroscopic sugar substitute additive product with a relatively high DE value produced by the process of claim 2.

14. A viscous, aqueous caries prevention or diabetic foodstuff, consistence improving agent or pharmaceutical product containing the sugar substitute additive product produced by the process of claim 3.

References Cited

UNITED STATES PATENTS 1,896,811    2/1933    Currib et al. _____ 195—43 X

OTHER REFERENCES

Gerber et al. J. Am. Pharm. Assoc. 46:635–639 (1957).
Okui: J. Pharm. Soc., Japan, 74: 1935-7 (1954).
Snyder: Food Eng. 25(6); 89, 90, 92 (1953).
Porges, N., et al., Ind. Eng. Chem., 32:107–111 (1940).

SHEP K. ROSE, Primary Examiner

U.S. Cl. X.R.

99—102, 129, 134, 140; 127—29, 36; 195—32, 43, 47; 260—535, 635

PO-1050
(5/69)

UNITED STATES PATENT OFFICE
CERTIFICATE OF CORRECTION

Patent No. 3,651,221     Dated March 21, 1972

Inventor(s) Ernst Conrad et al

It is certified that error appears in the above-identified patent and that said Letters Patent are hereby corrected as shown below:

Col. 3, line 4      "dispersion" should be --dispersing--.

Col. 5, line 16     "suitable" should be --suitably--.

Claim 5, line 1     After "carried" insert --out with--.

Signed and sealed this 18th day of July 1972.

(SEAL)
Attest:

EDWARD M. FLETCHER, JR.         ROBERT GOTTSCHALK
Attesting Officer                Commissioner of Patents